US008312556B2

(12) United States Patent
Itoh

(10) Patent No.: US 8,312,556 B2
(45) Date of Patent: Nov. 13, 2012

(54) INFORMATION PROCESSING APPARATUS AND INFORMATION PROCESSING PROGRAM UPDATING IDENTIFICATION INFORMATION VIA E-MAIL

(75) Inventor: Shingo Itoh, Komaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1227 days.

(21) Appl. No.: 11/903,000

(22) Filed: Sep. 27, 2007

(65) Prior Publication Data

US 2008/0083016 A1 Apr. 3, 2008

(30) Foreign Application Priority Data

Sep. 29, 2006 (JP) .................................. 2006-267746
Aug. 10, 2007 (JP) .................................. 2007-208914

(51) Int. Cl.
G06F 7/04 (2006.01)
G06F 17/30 (2006.01)
H04N 7/16 (2006.01)

(52) U.S. Cl. .................. 726/30; 726/26; 726/18; 726/2; 709/207; 709/219; 709/225; 709/223; 709/249; 455/466; 713/155; 713/160; 713/161; 713/184

(58) Field of Classification Search ................... 726/2
See application file for complete search history.

(56) References Cited

U.S. PATENT DOCUMENTS

| 5,719,941 A * | 2/1998 | Swift et al. .................... 713/155 |
| 6,757,280 B1 * | 6/2004 | Wilson, Jr. .................... 370/389 |
| 2003/0020961 A1 * | 1/2003 | Tanimoto ....................... 358/402 |
| 2003/0033451 A1 | 2/2003 | Yoshida et al. |
| 2004/0064730 A1 | 4/2004 | Kamiyama et al. |
| 2004/0248600 A1 * | 12/2004 | Kim ............................. 455/466 |
| 2006/0066895 A1 * | 3/2006 | Tonami et al. ................ 358/1.15 |

FOREIGN PATENT DOCUMENTS

| JP | 2001-94692 | 4/2001 |
| JP | 2003-058704 | 2/2003 |
| JP | 2003-131858 | 5/2003 |

(Continued)

OTHER PUBLICATIONS

Japanese Office Action, with partial English translation, issued in Japanese Patent Application No. JP 2007-208914, mailed Nov. 18, 2008.

(Continued)

*Primary Examiner* — Nathan Flynn
*Assistant Examiner* — Bryan Wright
(74) *Attorney, Agent, or Firm* — Baker Botts L.L.P.

(57) ABSTRACT

An information processing apparatus includes a use restriction unit that restricts use of the information processing apparatus based on identification information stored in an identification information storage unit, and a controller. The controller is operable to update the identification information stored in the identification information storage unit, send the updated identification information to a preset mail address, by an E-mail, receive an E-mail, determine whether the received E-mail is an E-mail replying to the sent E-mail, and control the identification information storage unit to store identification information included in the received E-mail as new identification information if the received E-mail is determined to be the E-mail replying to the sent E-mail.

20 Claims, 5 Drawing Sheets

FOREIGN PATENT DOCUMENTS

| | | |
|---|---|---|
| JP | 2004-140432 | 5/2004 |
| JP | 2005-092324 | 4/2005 |
| JP | 2006-039680 | 2/2006 |
| JP | 2006-65708 | 3/2006 |
| JP | 2006-093799 | 4/2006 |
| JP | 2006-171914 | 6/2006 |

OTHER PUBLICATIONS

European Search Report issued in Patent Application No. 07253860.6-2413, dated on Feb. 13, 2008.

Japanese Office Action, with partial English translation, issued in Japanese Patent Application No. 2007-208914, Mar. 17, 2009.

* cited by examiner (PROCESS BY THE INFORMATION PROCESSING APPARATUS)

FIG. 4A

Subject: PASSWORD UPDATE NOTICE
From: MFP <mfp@abc.co.jp>
Date: Wed, 13 Sep 2006 10:00:00 +0900
To: user1 <user1@abc.co.jp>
Cc: MFP <mfp@abc.co.jp>
Message-Id: <XXXXXXXX@abc.co.jp>

THE PASSWORD EXPIRATION DATE HAS BEEN PASSED, AND HAS BEEN UPDATED INTO THE FOLLOWING NEW PASSWORD.
IF YOU CHANGE THE PASSWORD, PLEASE WRITE ANOTHER PASSWORD AT THE TOP OF THE MAIL BODY AND SEND THIS WITHIN FIVE DAYS.

NEW PASSWORD: DLS04V-8UT
EXPIRATION DATE OF NEW PASSWORD: NOVEMBER 13, 2006

FIG. 4B

Subject: Re: PASSWORD UPDATE NOTICE
From: user1 <user1@abc.co.jp>
Date: Wed, 13 Sep 2006 12:00:00 +0900
To: MFP <mfp@abc.co.jp>
Message-Id: <AAAAAAAA@abc.co.jp>
References: <XXXXXXXX@abc.co.jp>

ABcd123456
>THE PASSWORD EXPIRATION DATE HAS BEEN PASSED,
>AND HAS BEEN UPDATED INTO THE FOLLOWING NEW PASSWORD.

>IF YOU CHANGE THE PASSWORD,
>PLEASE WRITE ANOTHER PASSWORD AT THE TOP OF THE MAIL BODY AND
>SEND THIS WITHIN FIVE DAYS.

>NEW PASSWORD: DLS04V-8UT
>EXPIRATION DATE OF NEW PASSWORD: NOVEMBER 13, 2006

FIG. 4C

Subject: PASSWORD CHANGE NOTICE
From: MFP <mfp@abc.co.jp>
Date: Wed, 13 Sep 2006 12:05:00 +0900
To: user1 <user1@abc.co.jp>
Cc: MFP <mfp@abc.co.jp>
Message-Id: <□□□□□□□□@abc.co.jp>

THE PASSWORD HAS BEEN CHANGED INTO THE FOLLOWING NEW PASSWORD.
NEW PASSWORD: ABcd123456
EXPIRATION DATE OF NEW PASSWORD: NOVEMBER 13, 2006

INFORMATION PROCESSING APPARATUS AND INFORMATION PROCESSING PROGRAM UPDATING IDENTIFICATION INFORMATION VIA E-MAIL

CROSS-REFERENCE TO RELATED APPLICATIONS

This application claims priority from Japanese Patent Applications No. 2006-267746 filed on Sep. 29, 2006 and No. 2007-208914 filed on Aug. 10, 2007, the entire subject matter of which is incorporated herein by reference.

TECHNICAL FIELD

Aspects of the present invention relate to an information processing apparatus and an information processing program for restricting the use of the information processing apparatus based on identification information.

BACKGROUND

In an information processing apparatus, which is used by a plurality of users, individual identification information (password) has been set for each user in order to restrict the use or function of the information processing apparatus based on the difference among users or administrators. To prevent the information processing apparatus from being illegally used because of a leakage of the password, the information processing apparatus allows the password to be regularly updated (see JP-A-2006-065708, for example).

According to JP-A-2006-065708, when the password of a user is updated by an information processing apparatus, the user and a group administrator of a group to which the user belongs are notified of the fact that the password of the user has been updated. The password updated thereby consists of a random character string, and is divided into a plurality of parts. The user obtains a part of the password from a Web server, and must obtain the remainder from the administrator of the group to which the user belongs. The administrator identifies the user as genuine, and notifies the user of the remainder of the password.

However, according to JP-A-2006-065708, the password to be updated is a random character string, and is not necessarily updated to be convenient for the user.

SUMMARY

Aspects of the present invention provide an information processing apparatus and an information processing program by which automatically-updated identification information can be simply and reliably changed to identification information convenient for users and administrators so as to be user-friendly and convenient therefor.

BRIEF DESCRIPTION OF THE DRAWINGS

FIGS. 4A to 4C show examples of an E-mail sent and received between the information processing apparatus and a PC.

DETAILED DESCRIPTION

<General Overview>

Figure 1:
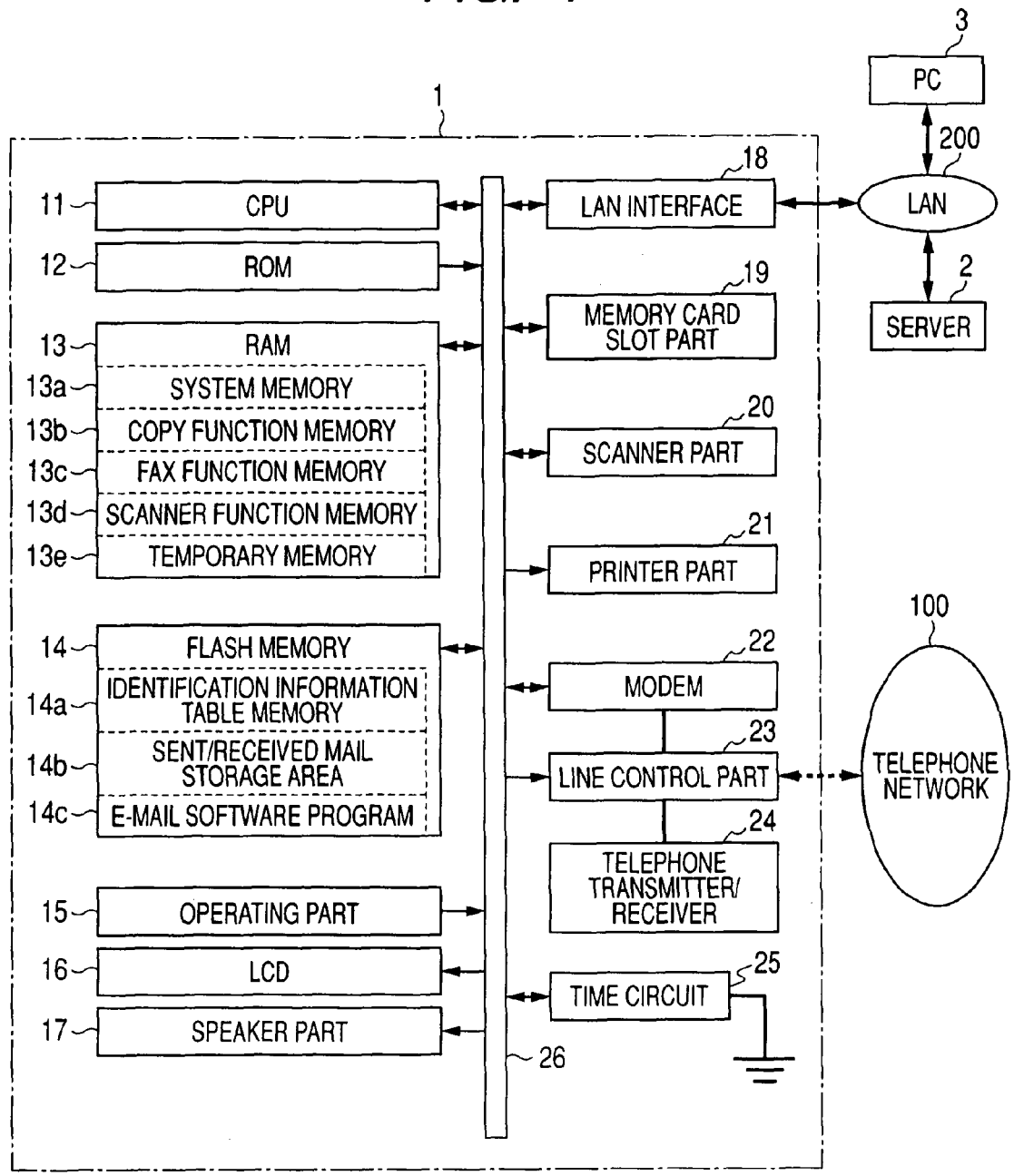
FIG. 1 is an exemplary block diagram showing an electric structure of an information processing apparatus and a communication system structure including the information processing apparatus.

According to an aspect of the present invention, there is provided an information processing apparatus including: a use restriction unit that restricts use of the information processing apparatus based on identification information stored in an identification information storage unit; and a controller that is operable to: update the identification information stored in the identification information storage unit; send the updated identification information to a preset mail address, by an E-mail; receive an E-mail; determine whether the received E-mail is an E-mail replying to the sent E-mail; and control the identification information storage unit to store identification information included in the received E-mail as new identification information if the received E-mail is determined to be the E-mail replying to the sent E-mail.

According to another aspect of the present invention, there is provided an information processing program product embodied on a computer-readable medium which, when executed by a computer, enables the computer to perform predetermined operations including: updating identification information stored in an identification information storage unit; sending the updated identification information to a preset mail address, by an E-mail; receiving an E-mail; determining whether the received E-mail is an E-mail replying to the sent E-mail; and controlling the identification information storage unit to store identification information included in the received E-mail as new identification information if the received E-mail is determined to be the E-mail replying to the sent E-mail.

According to still another aspect of the present invention, there is provided an information processing apparatus including: a use restriction means for restricting use of the information processing apparatus based on identification information stored in an identification information storage means; and an updating means for updating identification information stored in the identification information storage means; a mail sending means for sending identification information updated by the updating means to a preset mail address, by an E-mail; a mail receiving means for receiving an E-mail; a mail determination means for determining whether the E-mail received by the mail receiving means is an E-mail replying to the E-mail sent by the mail sending means; and a storing and updating means for controlling the identification information storage unit to store identification information included in the E-mail received by the receiving means as new identification information if the mail determination means determines that the E-mail received by the mail receiving means is an E-mail replying to the E-mail sent by the mail sending means.

According to the aspects of the invention, automatically-updated identification information can be simply and reliably changed into identification information convenient for the user and the administrator. Therefore, superior convenience for the user and the administrator can be achieved.

<Illustrative Aspects>

Illustrative aspects of the present invention will be described below with reference to the accompanying drawings. FIG. 1 is a block diagram showing an electric structure of an information processing apparatus 1 according to an aspect of the present invention and a communication system structure including the information processing apparatus 1.

As shown in FIG. 1, the communication system is made up of the information processing apparatus 1 having a plurality of functions, such as a printer function, a server 2 connected to the information processing apparatus 1 so that data communication can be carried out therebetween, and a personal computer (hereinafter, referred to simply as "PC") 3. The information processing apparatus 1, the server 2, and the PC 3 are each connected to a LAN 200, and can carry out data communication with each other through the LAN 200. The information processing apparatus 1 is connected to a telephone network 100, and, when a phone line is closed with equipment at the other end of the line, can carry on a conversation and exchange facsimile data with the equipment at the other end over the phone line.

The information processing apparatus 1 mainly includes a CPU 11, a ROM 12, a RAM 13, a flash memory 14, an operating part 15, an LCD 16, a speaker part 17, a LAN interface 18, a memory card slot part 19, a scanner part 20, a printer part 21, a modem 22, a line control part 23, a telephone transmitter/receiver 24, and a time circuit 25. These apparatus elements are connected together through a bus line 26. The modem 22, the line control part 23, and the telephone transmitter/receiver 24 are connected together through a transmission path.

The CPU 11 controls the elements connected together through the bus line 26 in accordance with fixed values and programs stored in the ROM 12, the RAM 13, and the flash memory 14, in accordance with the control of each function of the information processing apparatus 1, or in accordance with various signals sent and received through the line control part 23. The ROM 12 is a non-rewritable memory that stores control programs, or the like, that are executed by the information processing apparatus 1. The RAM 13 is a memory used to temporarily store various pieces of data, and includes a system memory 13a, a copy function memory 13b, a fax function memory 13c, a scanner function memory 13d, and a temporary memory 13e. The system memory 13a is used when the information processing apparatus 1 executes each function.

The information processing apparatus 1 includes a plurality of functions, i.e., mainly includes a scanner mode in which a sheet of document set on the scanner part 20 is read in the form of an image, a copy mode in which an image read and obtained in the scanner mode is printed by the printer part 21, a facsimile mode (hereinafter, referred to simply as "FAX mode") in which the image read in the scanner mode is transmitted over the telephone line and in which image signals transmitted from equipment provided at the other end of the line are printed by the printer part 21.

The copy function memory 13b is an area in which image data generated by the scanner part 20 is stored when the copy mode is selected. The fax function memory 13c is an area in which to-be-sent facsimile data or received facsimile data is stored. The scanner function memory 13d is an area in which image data generated by the scanner part 20 is stored when the scanner mode is selected. The temporary memory 13e is an area used when a memory area assigned to each mode mentioned above is insufficient or when data is required to be temporarily stored. The size of each area is set as occasion demands.

Figure 2:
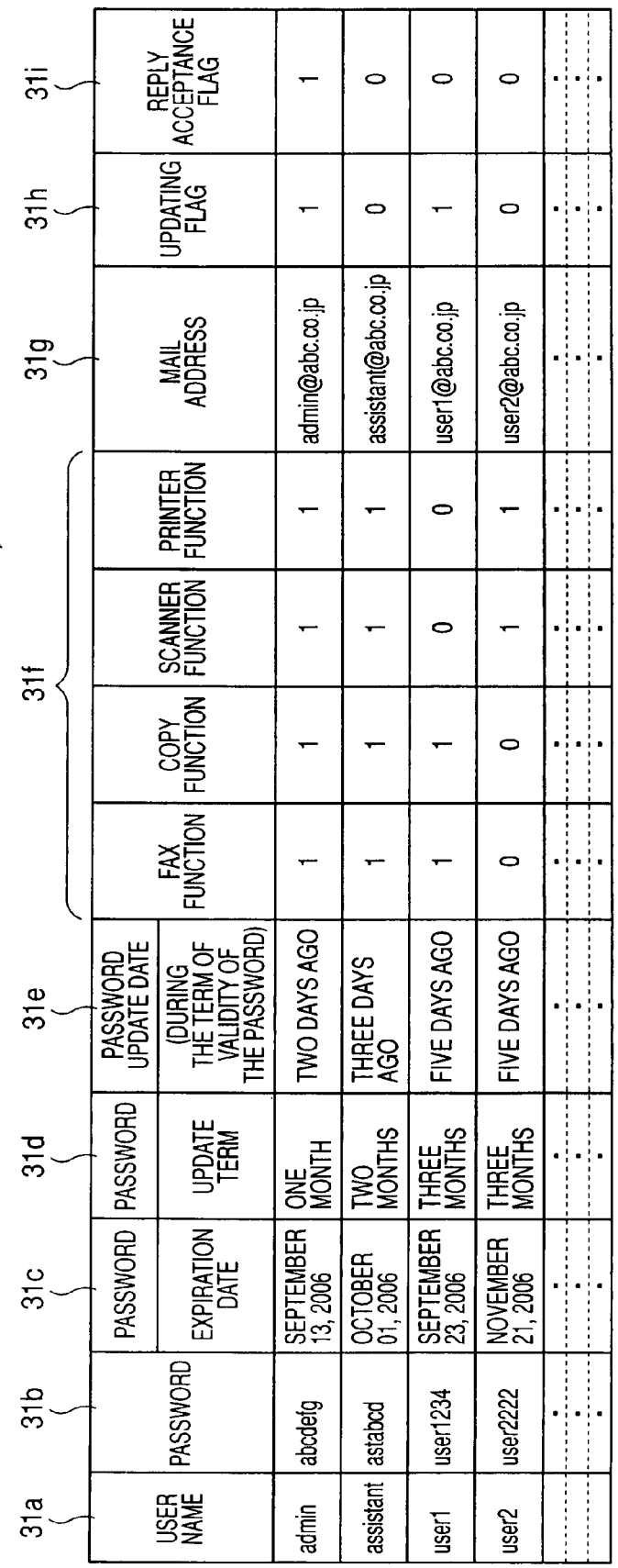
FIG. 2 shows an exemplary identification information table.

The flash memory 14 is a rewritable nonvolatile memory, and can retain stored data even after a power source is turned off. The flash memory 14 includes an identification information table memory 14a in which an identification information table 31 is stored, a mail storage area 14b in which E-mails sent or received by the information processing apparatus 1 are stored, and an E-mail program 14c to generate E-mails and send and receive these E-mails. The identification information table 31, of which a detailed description will be later given with reference to FIG. 2, is registration information that is pre-registered by an administrator. Pieces of registration information, such as user names 31a of users who are allowed to use the information processing apparatus 1, passwords 31b required when users use the information processing apparatus 1, or mail addresses 31g used when E-mails are transmitted from the information processing apparatus 1 to users, are stored in this table 31.

The operating part 15 consists of operational input keys with which the information processing apparatus 1 is operated. A user can turn on or off a power source and perform switching from a function to another by depressing the operational input keys. The LCD 16 is a liquid crystal display on which various pieces of information of the information processing apparatus 1 are displayed. A menu or an operational state corresponding to the depression of the operational input key is displayed on the LCD 16. An administrator can make an information addition or correction to the registration information of the identification information table 31 and can confirm an E-mail sent or received by the apparatus 1 by use of the operating part 15 and the LCD 16.

The speaker part 17 emits an operation sound of the operational input key, a warning sound produced when an error occurs, and a ringing sound produced when an E-mail or the like arrives. The LAN interface 18 is connected to the LAN 200, and can have data communications with the server 2 and the PC 3 that are connected to the LAN 200.

The memory card slot part 19 can freely read and write data stored in an external memory card by inserting this memory card into an insertion hole. The external memory card is a portable flash memory, and is a nonvolatile memory in which the contents of data are preserved even when the power source is turned off. Image data generated by the scanner part 20 described later can be written onto the external memory card, and image data in the external memory card can be read and printed by the printer part 21 described later.

Based on a command issued from the CPU 11, the scanner part 20 reads an image from a sheet of document set at a predetermined readout position (not shown), and produces image data of this image. When the information processing apparatus 1 is in the FAX mode, image data read by the scanner part 20 is sent to a device provided at the other end of the line specified by, for example, a telephone number through the modem 22, the line control part 23, and the telephone network 100. When the information processing apparatus 1 is in the copy mode, image data read by the scanner part 20 is printed on a recording sheet by the printer part 21. When the information processing apparatus 1 is in the scanner mode, image data read by the scanner part 20 is stored in a predetermined storage area in the RAM 13.

The printer part 21 is formed of an ink-jet printer that performs printing on a recording sheet set at a predetermined feed position (not shown) based on a command issued from the CPU 11, and includes a motor (not shown) used to convey sheets of recording paper, a print head (not shown) used to discharge ink onto the recording sheet, and a carriage motor (not shown) used to move a carriage (not shown) on which the print head is mounted.

When the information processing apparatus 1 is in the FAX mode and when facsimile data received through the telephone network 100, the line control part 23, and the modem 22 from a device provided at the other end of the line is set to be printed, image data generated from the facsimile data received from the other end of the line is printed on the recording sheet by the printer part 21. When the information processing apparatus 1 is in the copy mode, image data generated by the scanner part 20 is printed on the recording sheet by the printer part 21.

The modem 22 modulates image data generated by the scanner part 20 based on a command issued from the CPU 11 so as to generate an image signal that can be transmitted to the telephone network 100 through the line control part 23, or demodulates an image signal input from the telephone line 100 through the line control part 23 into image data.

The line control part 23 inputs various signals from the telephone network 100 and outputs a signal to the telephone network 100. Further, based on a command issued from the CPU 11, the line control part 22 sets a transmission path that serves as a transmission destination and as a transmission source of a signal that is input and output between the line control part 22 and the telephone network 100. A path leading to the modem 22 when an operation to transmit an image (to transmit facsimile data) is performed by the operating part 15 or when an image signal is received (facsimile data is received) from the telephone network 100 is set as the "transmission path." Accordingly, a state in which an image signal can be transmitted along this path is reached. In contrast, the transmission path set as above is released when the modem 22 stops outputting an image signal or when an image signal stops being input from the telephone line 100, so that a state in which an image signal cannot be transmitted along this path is reached.

When an operation (off-hook operation) to take the telephone transmitter/receiver 24 from the main part of the information processing apparatus 1 is performed, a path leading from the line control part 23 to the telephone transmitter/receiver 24 is set as the above-mentioned transmission path, and a state in which a sound signal can be transmitted along the path is reached. When an operation (on-hook operation) to return the telephone transmitter/receiver 24 to the main part of the information processing apparatus 1 is performed, the thus set transmission path is released, and a state in which a sound signal cannot be transmitted along the path is reached. The time circuit 25, which includes an internal clock that ticks away the present date and time, is a known circuit that calculates the amount of time required by a comparison between the time-measurement starting date and time and the present date and time.

Next, a description will be given of the identification information table 31 stored in the identification information table memory 14*a* with reference to FIG. 2. FIG. 2 is the identification information table 31 showing users who can use the information processing apparatus 1 and pieces of registration information that are pre-registered for each user.

As shown in FIG. 2, the identification information table 31 has a user name 31*a*, a password 31*b*, a password expiration date 31*c*, a password update term 31*d*, a password update date 31*e*, a use-permit flag 31*f* of each function, a mail address 31*g*, an updating flag 31*h*, and a reply acceptance flag 31*i* of one user per row.

The user name 31*a* is a name used to allow the information processing apparatus 1 to identify a user. The password 31*b* is identification information used to confirm whether the person is a user in question. The password expiration date 31*c* is a date until which a password being currently used by a user can be used, and hence the password becomes invalid after this expiration date. The password update term 31*d* is a period from the update of the password to the next update thereof, and hence the password can be regularly updated by setting this period.

The password update date 31*e* shows days during which the password can be updated before the password expiration date, and hence, even if the user has forgotten updating the password, the password is updated by the information processing apparatus 1 when a predetermined date is reached.

The use-permit flag 31*f* states whether a user is permitted to use each function, such as a FAX function or a copy function. If the user is permitted to use such a function, the flag is set at 1 (ON), and, if not permitted, the flag is set at 0 (OFF) The mail address 31*g* is a user's E-mail address. When the password is updated, an E-mail saying that the password has been updated is sent to the mail address in which the password is set.

The updating flag 31*h* is a flag that is set at 1 (ON) when the password is updated by the information processing apparatus 1 so that the user can update the password by sending an E-mail reply. The reply acceptance flag 31*i* is a flag that is set at 1 (ON) when an E-mail reply is sent from the user during a predetermined period, and the password is changed into a password mentioned in the E-mail reply sent therefrom. Only an administrator can make an addition and correction to the information stored in the identification information table 31, and each user can make a change only in user's own password.

Figure 3A:
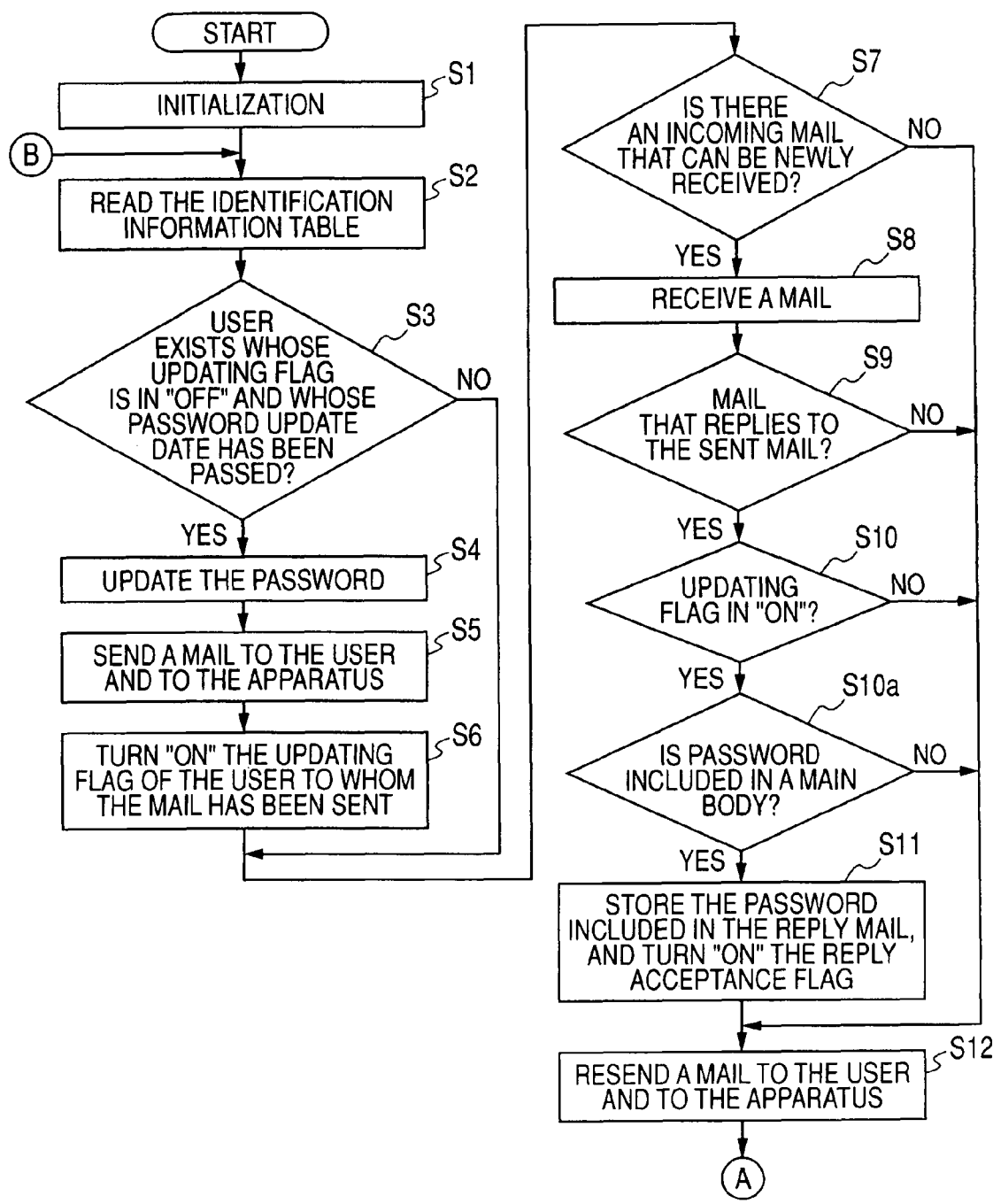
FIGS. 3A and 3B are exemplary flowcharts showing a main process of the information processing apparatus.
Figure 3B:
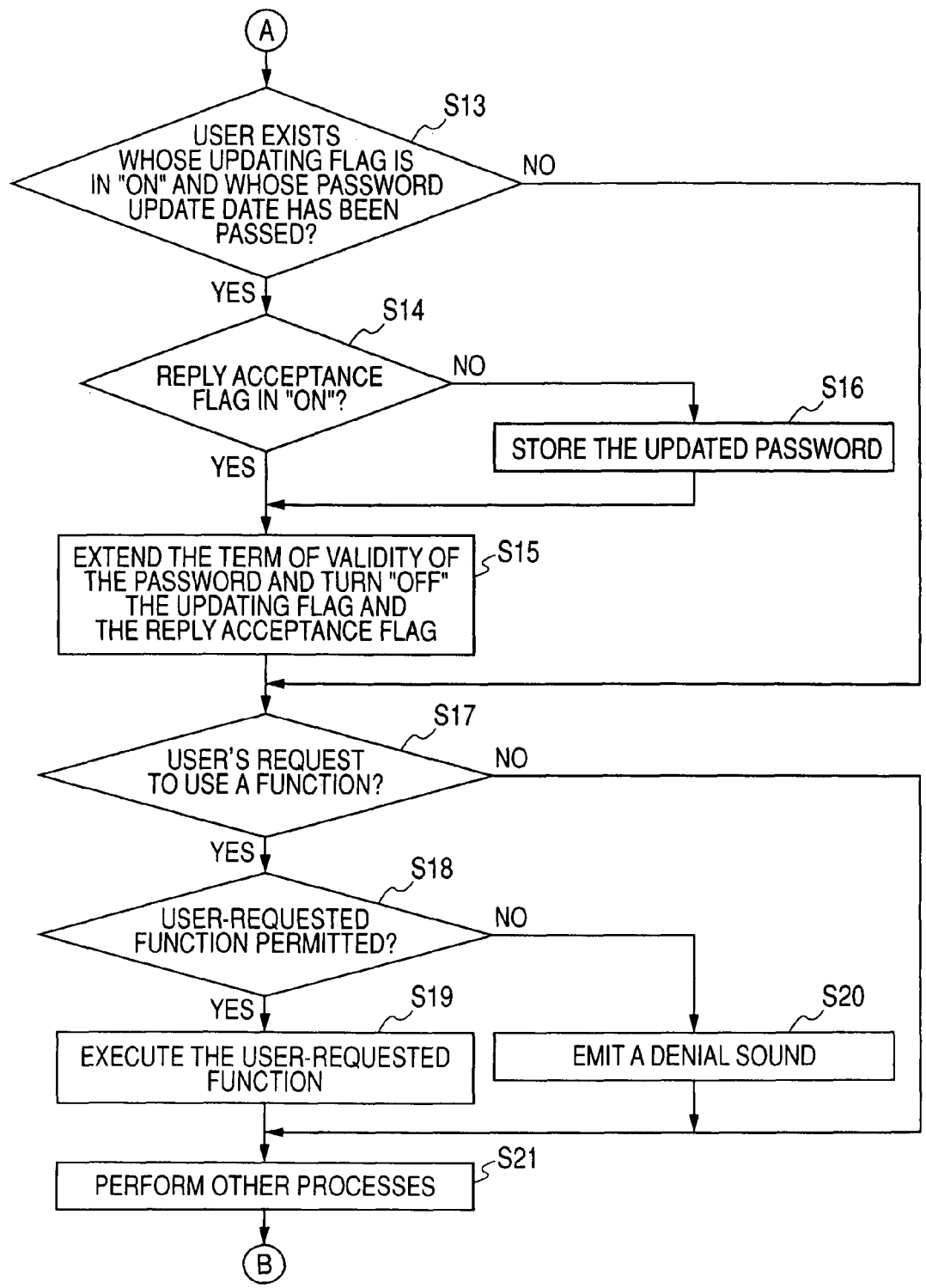

Next, a process executed by the CPU 11 of the information processing apparatus 1 will be described with reference to FIGS. 3A and 3B. FIGS. 3A and 3B are exemplary flowcharts showing a main process that is repeatedly performed until a power source of the information processing apparatus 1 is turned off after the power source is turned on.

In the main process, initialization is first performed (S1). At this step, the CPU 11, the RAM 13, and each function are initialized. Thereafter, the identification information table 31 stored in the flash memory 14 is read into the system memory 13*a* (S2). For each user, a determination is made as to whether the updating flag 31*h* is 0 (OFF) and whether the password update date 31*e* has been passed (S3).

The password update date 31*e* shows the number of days before the password expiration date 31*c* to update the password. The information processing apparatus 1 subtracts the number of days of the password update date 31*e* from the password expiration date 31*c*, and uses this as a scheduled update date. A determination is made as to whether the scheduled update date has been passed by making a comparison between the scheduled update date and the present date read from the time circuit 25.

If the updating flag 31*h* is 0 (OFF), and if there is a user whose password update date 31*e* has been passed (S3: Yes) at step S3, the password of this user is updated (S4). To prevent illegal decoding, the password to be updated consists of a random character string. An E-mail (hereinafter referred to as "outgoing mail") in which specific information has been added to the E-mail mentioning the updated password in order to specify this E-mail (for example, an E-mail shown in FIG. 4A) is sent to a user whose password has been updated and to the information processing apparatus 1 (S5).

Herein, the specific information, which will be described later with reference to FIGS. 4A to 4C, denotes a field value mentioned in a "Message-ID field" included in a header of an E-mail, which consists of a completely unique string of characters by which a sent mail can be discriminated from other E-mails in all the world. If an E-mail (hereinafter referred to as "reply mail") replying to the sent mail is formed, this E-mail has the completely unique character string mentioned as a field value of a "References field" included in a header of the E-mail. Therefore, a determination can be made as to whether the E-mail is a reply mail replying to the sent mail.

When an E-mail to be sent to a user is transmitted to a mail address stored in the mail address 31*g* corresponding to the user name 31a by the process of S5, the updating flag 31h of the user is set at 1 (ON) (S6). In contrast, if the updating flag 31h is 0 (OFF), and if there is no user whose password update date 31e has been passed at step S3 (S3: No), the process proceeds to step S7.

Thereafter, a determination is made as to whether there is an E-mail (hereinafter, referred to as "incoming mail") that can be newly received (S7). If there is a new incoming mail at step S7 (S7: Yes), this mail is received (S8). Thereafter, a determination is made as to whether the mail received at step S8 is a reply mail of a user replying to the sent mail (S9). Whether the received mail is a reply mail of a user replying to the sent mail is determined by whether the field value of the Message-ID field included in the header of the sent mail is equal to the field value of the References field included in the reply mail. If equal, the received mail is determined to be a reply mail replying to the sent mail. A password intended to be changed by the user is included at the top of the main body of the reply mail.

If the received mail is a reply mail (e.g., an E-mail shown in FIG. 4B) sent from the user (S9: Yes), a determination is made as to whether the updating flag 31h of the user is 1 (ON) (S10). If the updating flag 31h of the user is 1 (ON) at step S10 (S10: Yes), a determination is made as to whether a password is included in the main body of the reply mail (S10a).

Specifically, a determination is made as to whether a predetermined character string that is configurable as a password is mentioned in the first line of data that configures the main body of the reply mail formed by the user. A determination is made as to, for example, whether the predetermined character string includes predetermined number of characters (e.g. 10 letters) or whether the predetermined character string is configured by a predetermined character such as ASCII character (except for control character or blank character).

According to such determination, even if the user erroneously sends reply mail without mentioning the password, for example, it can be prevented the password 31b of the user from being stored in the identification information table 31 as "null." Further, by the determination as to whether the predetermined character string is configured by a predetermined character, even if the user erroneously inputs the control character that is not displayed on the display, it can be prevented the password 31b of the user including different character than the predetermined character from being stored in the identification information table 31. Therefore, inputting error of the user can be suppressed.

Further, if some sort of a communication error occurs during data communication such as E-mail, the data may not be exchanged correctly. That is, if the reply mail mentioning the password of the user encounters the communication error before reaching to the information processing apparatus 1, content of the reply mail may be changed. For example, the characters included in the reply mail may be garbled. As a result, the password (character string) of the user may be changed, for example, into the control character, or the character number of the password (character string) may be changed. The changed password (character string) may be stored in the identification information table 31 as the password 31b of the user. However, in the present aspect, it can be prevented the password 31b of the user without including predetermined character number or predetermined character from being stored in the identification information table 31. That is, if the password of the user is changed, it is possible to prevent the changed password from being stored as a new password of the user.

If the password is included in the main body of the reply mail (S10a: Yes), a password intended to be changed by the user included in the reply mail replying to the sent mail is stored in the password 31b of the identification information table 31, and the reply acceptance flag 31i is set at 1 (ON) (S11). An E-mail (re-sent mail) (for example, an E-mail shown in FIG. 4C) in which a newly stored password has been included is again sent to the user and to the information processing apparatus 1 (S12).

In contrast, if the password is not included in the main body of the reply mail (S10a: No), the reply mail of the user is invalidated, and the process skips steps S11 and S12 and proceeds to step S13.

In contrast, if there is no incoming mail that can be newly received at step S7 (S7: No), and if the received mail is not a reply mail sent from the user at step S9 (S9: No), and if the updating flag 31h is 0 (OFF) at step S10 (S10: No), the process proceeds to step S13.

Thereafter, a determination is made as to whether the updating flag 31h is 1 (ON) for each user and whether the password expiration date 31c has been passed for each user (S13). Whether the password expiration date 31c has been passed is determined by a comparison between the password expiration date 31c of the user and the present date read by the time circuit 25. If the updating flag 31h is 1(ON), and if there is a user whose password expiration date 31c has been passed at step S13 (S13: Yes), a determination is made as to whether the reply acceptance flag 31i of the user is 1 (ON) (S14).

If the reply acceptance flag 31i is 1 (ON) at step S14 (S14: Yes), the process proceeds to step S15. If the reply acceptance flag 31i is 0 (OFF) at step S14 (S14: No), the updated password is stored as a new password 31b (S16). Thereafter, a date obtained by adding the value of the password update term 31d to the value of the present password expiration date 31c is stored as a new password expiration date 31c, and the value of the updating flag 31h and the value of the reply acceptance flag 31i are set at 0 (OFF) (S15). In contrast, if the updating flag 31h is 1 (ON), and if there is no user whose password expiration date 31c has not been passed at step S13 (S13: No), the process proceeds to step S17.

These steps enable the regular update of the password. Next, a description will be given of a process performed when a user uses the information processing apparatus 1 by use of the thus updated password.

To use the functions of the information processing apparatus 1, the user must input the username 31a and the password 31b into the information processing apparatus 1. The user inputs the user name and the password by, for example, a numeric keypad of the operating part 15 into the information processing apparatus 1. When the user operates the information processing apparatus 1 via the LAN 200, the user name and the password are input from a user's terminal. The information processing apparatus 1 determines whether the user name and the password are correct. Only when the user name and the password are correct, the request of the user to use a function is accepted.

In this process, first, the information processing apparatus 1 determines whether the user has requested to use a function (S17). If there is a request to use a function from the user at step S17 (S17: Yes), a determination is made as to whether the use-permit flag 31f of the function requested by the user is 1 (ON) (S18). If the use-permit flag 31f of the function requested by the user is 1 (ON) at step S18 (S18: Yes), the function required by the user is executed (S19). In contrast, if the use-permit flag 31f of the function requested by the user is 0 (OFF) at step S18 (S18: No), a denial sound is emitted (S20), and the process proceeds to step S21.

If there is no request to use a function from the user at step S17 (S17: No), the process proceeds to step S21. Other operations are performed at step S21 (S21), and the process returns to step S2. For example, the "other operations" performed at step S21 are to detect that the operating part 15 has been operated and then perform an operation according to the operation of the operating part 15, and to perform a receiving operation through the telephone network 100.

Next, referring to FIGS. 4A to 4C, a description will be given of E-mails exchanged between the information processing apparatus 1 and the PC 3 through the server 2. Each of the information processing apparatus 1 and the PC 3 has an E-mail software program. An E-mail is formed by this E-mail program, and is sent or received through the server 2.

FIG. 4A shows an example of an E-mail (sent mail) sent to the PC 3, which is used by the user, from the information processing apparatus 1, FIG. 4B shows an example of an E-mail (reply mail) returned from the PC 3 used by the user to the information processing apparatus 1, and FIG. 4C shows an example of an E-mail (re-sent mail) retransmitted to the PC 3 used by the user from the information processing apparatus 1.

The E-mail consists of a header and a body. The header has an item name (field) showing various pieces of attribute information about the E-mail and an item value (field value) corresponding to the item name that are produced by the E-mail program or by the server (mail server) 2 for each field. Sentences to be sent to the destination of the mail, i.e., to the user are included in the body.

FIG. 4A is an example of a sent mail 41 to be sent to the PC 3 used by the user by performing the step S5 in the flowchart of FIG. 3A. A description will be given of the header 42 of the sent mail 41 produced by the information processing apparatus 1.

A Subject field, a From field, a Date field, a To field, a Cc field, a Message-ID field, and a field value corresponding to each field are included in the header 42.

For example, in the Subject field, the title "Password Updating Notice" is expressed as a field value. For example, in the From field, the mail address "MFP@abc.co.jp" of the information processing apparatus 1 is expressed as a field value. For example, in the Date field, the sent date and time "Wed, 13, September 2006 10:00:00 +0900" is expressed as a field value. For example, in the To field, the mail address "user1@abc.co.jp" of a user whose password has been updated is expressed as a field value. Concerning the mail address, a mail address 31g corresponding to a user whose password has been updated is extracted from the identification information table 31. For example, in the Cc field, the mail address "MFP@abc.co.jp" of the apparatus that is a destination of a copy of the sent mail is expressed as a field value. For example, in the Message-ID field, the completely unique character string "XXXXXXXX@abc.co.jp," which is produced as a specific piece of information by the E-mail program or by the server 2, is expressed as a field value.

In the body 43, the password updated at step S4 in the flowchart of FIG. 3A is expressed as, for example, "New password: DLS04V-8UT." In addition, a message for the user, such as the expiration date of the password, is included in the body 43.

A sent mail is transmitted from the information processing apparatus 1 to the PC 3 through the server 2. A user who has received the sent mail 41 confirms the contents of the mail, and understands that the password has been updated. A newly updated password is included in the E-mail received by the user. This password consists of a random string of characters so as not to be illegally decoded. If the user feels that the newly updated password is inferior in convenience, the user can change the newly updated password into a desired one by forming a reply mail replying to the received mail and by sending the reply mail, in which the desired password is included at the top of the mail body, to the information processing apparatus 1.

Next, referring to FIG. 4B, a description will be given of an example of a reply mail 44 sent from the user which is determined at step S9 in the flowchart of FIG. 3A. In detail, a description is given of the header 45 of the reply mail formed by the PC 3 used by the user.

For example, in the Subject field, the title "Re: Password Updating Notice" is expressed. For example, in the From field, the mail address "user1@abc.co.jp" of the user is expressed. For example, in the Date field, the sent date and time "Wed, 13, September 2006 12:00:00 +0900" is expressed. For example, in the To field, the mail address "MFP@abc.co.jp" of the information processing apparatus 1 is expressed.

For example, in the Message-ID field, a new, completely unique character string "△△△△△△△△@abc.co.jp" is expressed as a specific piece of information. A "References field" is newly added to the reply mail. The References field is added to specify which received mail the reply mail corresponds to. A value included in the Message-ID field of a received mail, i.e., an identifiable, completely unique character string is expressed without changes. For example, in the main body 46, character string "ABcd123456" inputted by the user who forms the reply mail is described in the first line of the mail body.

An E-mail (reply mail) replying to the sent mail has the character string of this Message-ID included in the References field, and is sent as a reply. Therefore, at step S9, the information processing apparatus 1 can determine which sent mail the reply mail corresponds to. Further, the user inputs a newly changed password desired by the user as, for example, "ABcd123456" at the top of the mail body 46, and sends a reply mail having this password. Thus, the information processing apparatus 1 can set "ABcd123123" as a new password. Therefore, the password can be easily updated unlike a related example in which the password is reset by using an updated password.

FIG. 4C shows an example of a re-sent mail 47 transmitted to a user through step S12 in the flowchart of FIG. 3A. A header 48 of the re-sent mail 47 produced by the information processing apparatus 1 will be described. A description of the same header part as that of the sent mail 41 of FIG. 4A is omitted, and only different parts are described.

For example, in the Subject field, the title "Password Change Notice" is expressed. For example, in the Message-ID field, a new, completely unique character string "□□□□□□□@abc.co.jp" is expressed as a specific piece of information. In the mail body 43, a password intended to be changed by a user is expressed as, for example, "New password: ABcd123456." In addition, the expiration date of the password, the reason why the password has been changed, messages to the user, etc., are included therein.

The process of step S4 in the flowchart of FIG. 3A functions as updating means, the process of step S5 in the flowchart of FIG. 3A functions as mail sending means, the process of step S8 in the flowchart of FIG. 3A functions as mail receiving means, the process of step S9 in the flowchart of FIG. 3A functions as mail determination means, the process of steps S11 and S16 in the flowchart of FIGS. 3A and 3B function as storing and updating means, and the process of steps S10 and S13 in the flowchart of FIGS. 3A and 3B function as time determination means.

Aspects of the present invention has been described as above. However, the present invention is not limited to the above aspects. It will be easily understand that the present invention can be variously improved and modified within the scope not departing from the spirit of the present invention.

For example, in the above aspects, even if a password is updated, this updated password is not stored in the identification information table 31 at step S4 in the flowchart of FIG. 3A. Instead, it is permissible that this password is stored at step S4, and, only when a reply mail is received, a password that meets the desire of the user is stored.

Further, in the above aspects, a determination is made as to whether a predetermined character string is mentioned in the first line of the main body of the reply mail. However, a place is not limited to the first line of the main body of the reply mail. It is possible to determine as to whether a predetermined character string that is configurable as a password is mentioned in some place of the main body of the reply mail. For example, the information processing apparatus 1 may determine character string subsequent to "PW:" described in a line which includes "PW:" in the main body of the reply mail as a password. The user may mention "PW:" and a password subsequent to "PW:" in some line of the main body of the reply mail and send the reply mail to the information processing apparatus 1. The information processing apparatus 1 can determine the password intended to be changed by the user by confirming the content of the main body or the top of the main body of the reply mail. Therefore, the information processing apparatus 1 can easily and correctly change the password intended to be changed by the user or by the administrator.

In the above aspects, if the password is not included in the main body of the reply mail (S10a: No), the reply mail of the user is invalidated. In this case, it may be possible to send an E-mail notifying the user that the reply mail is invalidated. For example, it may be possible to notify "Reply mail is determined to be invalidated by the information processing apparatus 1. Please send reply mail again." to the user. Accordingly, the user can be notified that updating of the password is failed in the information processing apparatus due to the reason that he/she fails to send the reply mail without mentioning the password or some sort of communication error is occurred. Thus, the user can take necessary procedures to update the password again.

According to another aspect of the invention, the information processing apparatus includes the identification information storage unit that stores the identification information.

According to still another aspect of the invention, the controller sends the E-mail with adding specific information for specifying the E-mail, and the controller determines whether the received E-mail is the E-mail replying to the sent E-mail based on the specific information added to the received E-mail.

According to still another aspect of the invention, the controller is further operable to determine whether a predetermined time has elapsed since the E-mail is sent, and the controller controls the identification information storage unit to store the identification information included in the received E-mail as new identification information if the predetermined time is determined not to have elapsed.

According to still another aspect of the invention, the controller controls the identification information storage unit to store the updated identification information as new identification information if the predetermined time is determined to have elapsed without receiving the E-mail replying to the sent E-mail.

According to still another aspect of the invention, the controller sends the E-mail by adding specific information to a predetermined field included in a header of the E-mail, and the controller is operable to search the received E-mail whether the specific information is included in the header of the E-mail.

According to still another aspect of the invention, the controller is further operable to search the identification information in a main body of the received E-mail, and the controller controls the identification information storage unit to store the searched identification information as new identification information.

According to still another aspect of the invention, the controller searches the identification information from a top of the main body of the received E-mail.

According to still another aspect of the invention, the controller searches the identification information from the main body of the received E-mail if the received E-mail is determined to be the E-mail replying to the sent E-mail.

According to still another aspect of the invention, the identification information specifies a user for restricting use of the information processing apparatus based on the identification information, and the controller is further operable to: generate the identification information in accordance with predetermined rule; automatically update the identification information stored in the identification information storage unit to the generated identification information; and control the identification information storage unit to store desired identification information of the user included in the received E-mail as new identification information.

According to still another aspect of the invention, the controller sends the new identification stored in the information storage unit to the preset mail address by an E-mail.

According to still another aspect of the invention, the information processing apparatus is connected to terminals of a plurality of users via a network and includes a plural kinds of functions that are usable by the plurality of users, and the controller is further operable to store register information of functions to be restricted of use by each user, in association with the identification information.

According to still another aspect of the invention, the controller stores register information of password update term in which the controller updates the identification information, in association with the identification information per user.

According to still another aspect of the invention, the controller is further operable to search the identification information in a main body of the received E-mail, and the controller controls the identification information storage unit to store the searched identification information as new identification information.

According to still another aspect of the invention, the controller searches the identification information from a top of the main body of the received E-mail.

According to still another aspect of the invention, the controller searches the identification information from the main body of the received E-mail if the received E-mail is determined to be the E-mail replying to the sent E-mail.

According to still another aspect of the invention, the information processing apparatus includes the identification information storage means that stores the identification information.

According to still another aspect of the invention, the mail sending means sends the E-mail with adding specific information for specifying the E-mail, and the mail determination means determines whether the received E-mail is the E-mail replying to the E-mail sent by the mail sending means based on the specific information added to the received E-mail.

What is claimed is:

1. An information processing apparatus comprising:
a use restriction unit configured to restrict use of the information processing apparatus based on identification information stored in an identification information storage unit; and
a controller configured to:
update the identification information stored in the identification information storage unit;
add the updated identification information to a main body of an E-mail;
send the E-mail, via an outgoing E-mail processing unit, to a preset mail address and the information processing apparatus itself, wherein specific information for specifying the E-mail is added to a header of the sent E-mail by the outgoing E-mail processing unit;
receive a reply E-mail;
determine whether added information added to a header of the received reply E-mail is equal to the specific information added to the header of the sent E-mail sent to the information processing apparatus; and
store identification information comprised in a main body of the received reply E-mail as new identification information in the identification information storage unit when the added information added to the header of the received reply E-mail equals the specific information added to the header of the sent E-mail sent to the information processing apparatus.

2. The information processing apparatus according to claim 1,
wherein the information processing apparatus comprises the identification information storage unit that stores the identification information comprised in the main body of the received reply E-mail.

3. The information processing apparatus according to claim 1,
wherein the controller is further configured to determine whether the reply E-mail is received within a predetermined period of time, and
wherein the controller is further configured to store the identification information comprised in the main body of the received reply E-mail as new identification information in the identification information storage unit when the reply E-mail is received within the predetermined period of time.

4. The information processing apparatus according to claim 3, wherein the controller is further configured to store the updated identification information comprised in the main body of the sent E-mail sent to the information processing apparatus as the new identification information in the identification information storage unit when the reply E-mail is not received within the predetermined period of time.

5. The information processing apparatus according to claim 1,
wherein the controller is configured to search the identification information in the main body of the received reply E-mail, and
wherein the controller is configured to control the identification information storage unit to store the searched identification information as the new identification information when the added information added to the header of the received reply E-mail equals the specific information added to the header of the sent E-mail sent to the information processing apparatus.

6. The information processing apparatus according to claim 5,
wherein the controller is configured to search the identification information from a top of the main body of the received reply E-mail.

7. The information processing apparatus according to claim 5,
wherein the controller is configured to search the identification information from the main body of the received reply E-mail when the added information added to the header of the received reply E-mail is determined to be equal to the specific information added to the header of the sent E-mail sent to the information processing apparatus.

8. The information processing apparatus according to claim 1,
wherein the identification information specifies a user for restricting use of the information processing apparatus based on the identification information, and
wherein the controller is further configured to:
generate the identification information in accordance with a predetermined rule;
automatically update the identification information stored in the identification information storage unit to the generated identification information; and
control the identification information storage unit to store desired identification information from the user included in the main body of the received E-mail as new identification information.

9. The information processing apparatus according to claim 1,
wherein the sent E-mail comprises the new identification information stored in the information storage unit.

10. The information processing apparatus according to claim 1,
wherein the information processing apparatus is connected to a plurality of terminals via a network and comprises a plurality of functions that are usable by the plurality of users, and
wherein the controller is configured to store register information of functions to be use restricted, in association with the identification information.

11. The information processing apparatus according to claim 10,
wherein the controller is configured to store register information of an update term in which the controller updates the identification information, in association with the identification information per user.

12. A non-transitory computer-readable medium having an information processing program stored thereon and readable by a computer of an information processing apparatus, the computer program, when executed by the computer, causes the computer to perform predetermined operations comprising:
updating identification information stored in an identification information storage unit;
adding the updated identification information to a main body of an E-mail;
sending the E-mail, via an outgoing E-mail processing unit, to a preset mail address and the information processing apparatus itself, wherein specific information for specifying the E-mail is added to a header of the sent E-mail by the outgoing E-mail processing unit;
receiving a reply E-mail;
determining whether added information added to a header of the received reply E-mail is equal to the specific information added to the header of the sent E-mail sent to the information processing apparatus;

storing identification information comprised in a main body of the received reply E-mail as new identification information in the identification information storage unit when the added information added to the header of the received reply E-mail equals the specific information added to the header of the sent E-mail sent to the information processing apparatus.

13. An information processing apparatus comprising:

a use restriction means for restricting use of the information processing apparatus based on identification information stored in an identification information storage means; and an updating means for updating identification information stored in the identification information storage means;

an adding means for adding the updated identification information to a main body of an E-mail;

a mail sending means for sending the E-mail, via an outgoing E-mail processing means, to a preset mail address and the information processing apparatus itself, wherein specific information for specifying the E-mail is added to a header of the sent E-mail by the outgoing E-mail processing means;

a mail receiving means for receiving a reply E-mail;

a determination means for determining whether added information added to a header of the reply E-mail received by the mail receiving means is equal to the specific information added to the header of the E-mail sent to the information processing apparatus by the mail sending means; and a storing and updating means for storing identification information comprised in a main body of the reply E-mail received by the receiving means as new identification information in the identification information storage means when the added information added to the header of the reply E-mail received by the mail receiving means is equal to the specific information added to the header of the sent E-mail sent to the information processing apparatus by the mail sending means.

14. The information processing apparatus according to claim 13, wherein the information processing apparatus comprises the identification information storage means for storing the identification information comprised in the main body of the reply E-mail received by the mail receiving means.

15. The information processing apparatus according to claim 1, wherein the controller is configured to:

determine whether identification information is comprised in the main body of the received reply E-mail when the added information added to the header of the received reply E-mail is determined to be equal to the specific information added to the header of the sent E-mail sent to the information processing apparatus, wherein when the identification information is comprised in the main body of the received E-mail, the controller is configured to store the identification information as the new identification information, and wherein when the identification information is determined not to be included in the main body of the received reply E-mail, the controller does not store information comprised in the main body of the received reply E-mail as the new identification information.

16. An information processing apparatus comprising:

a use restriction unit configured to restrict use of the information processing apparatus based on identification information stored in an identification information storage unit; and a controller configured to:

update the identification information stored in the identification information storage unit;

add the updated identification information to a main body of an E-mail;

send the E-mail, via an outgoing E-mail processing unit, to a preset mail address and the information processing apparatus itself, wherein specific information for specifying the E-mail is added to a header of the sent E-mail by the outgoing E-mail processing unit;

receive a reply E-mail within a predetermined period of time;

determine whether added information added to a header of the received reply E-mail is equal to the specific information added to the header of the sent E-mail sent to the information processing apparatus;

store identification information comprised in a main body of the received reply E-mail as new identification information in the identification information storage unit when the controller receives the reply E-mail within the predetermined period of time and the added information added to the header of the received reply E-mail equals the specific information added to the header of the sent E-mail sent to the information processing apparatus; and store the updated identification information added to the main body of the sent E-mail sent to the information processing apparatus as the new identification information in the identification information storage unit when the controller has not received the reply E-mail within the predetermined period of time.

17. The non-transitory computer-readable medium of claim 12, wherein, the computer program causes the computer to perform predetermined operations further comprising:

determining whether the reply E-mail is received within a predetermined period of time; and storing identification information comprised in the main body of the received reply E-mail as new identification information in the identification information storage unit when the reply E-mail is received within the predetermined period of time.

18. The non-transitory computer-readable medium of claim 17, wherein, the computer program causes the computer to perform predetermined operations further comprising:

storing the updated identification information added to the main body of the sent E-mail sent to the information processing apparatus as the new identification information in the identification information storage unit when the reply E-mail is not received within the predetermined period of time.

19. The information processing apparatus according to claim 13, wherein the information processing apparatus further comprises:

a time determining means for determining whether the reply E-mail is received within a predetermined period of time, wherein the storing and updating means further is a means for storing identification information comprised in the main body of the reply E-mail received by the receiving means as new identification information in the identification information storage means when the reply E-mail is received within the predetermined period of time.

20. The information processing apparatus according to claim 19, wherein the storing and updating means further is a means for storing the updated identification information added to the main body of the sent E-mail sent to the information processing apparatus as the new identification information in the identification information storage means when the reply E-mail is not received within the predetermined period of time.

\* \* \* \* \*